Dec. 31, 1929. H. S. BURNHAM 1,741,975
BALL JOINT
Filed July 8, 1927
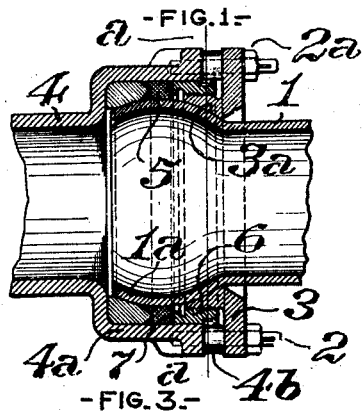
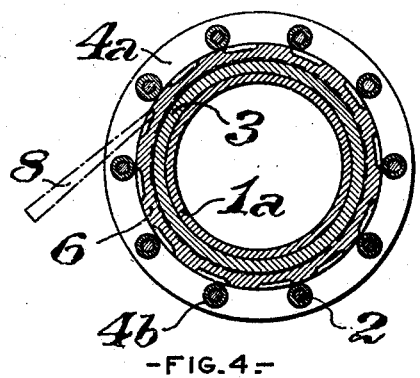
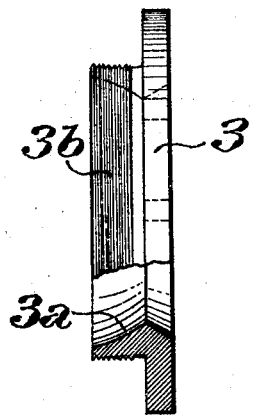
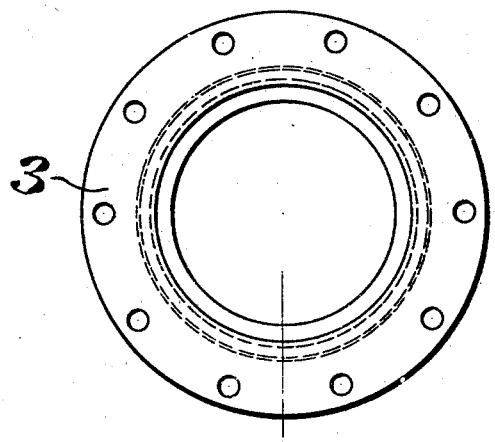
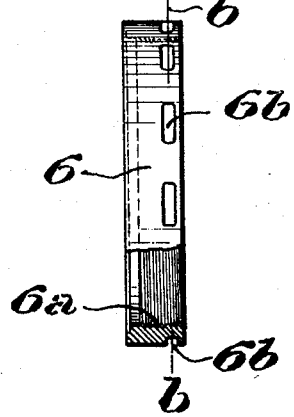
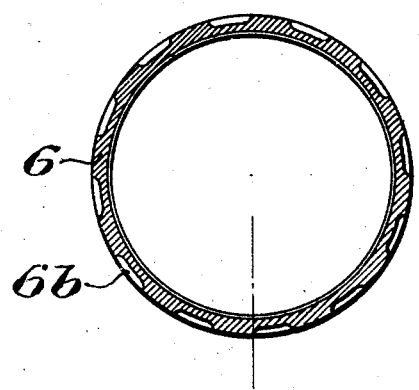

Patented Dec. 31, 1929

1,741,975

UNITED STATES PATENT OFFICE

HARRY S. BURNHAM, OF SCHENECTADY, NEW YORK

BALL JOINT

Application filed July 8, 1927. Serial No. 204,215.

This invention relates to flexible joints for pipes, of the ball and socket type, and its object is to provide an appliance of such character that will be of strong, simple, and inexpensive construction, and, in the operation of which, means will be afforded for properly packing the joint, and maintaining the tightness of the packing to withstand high pressure in the connected pipe sections.

The improvement claimed is hereinafter fully set forth.

In the accompanying drawing: Figure 1 is a longitudinal central section through a ball joint, illustrating an application of the invention; Fig. 2, a transverse section through the same, on the line $a\ a$ of Fig. 1; Fig. 3, a side view, partly in section, and on an enlarged scale, of the bearing gland; Fig. 4, a face view of the same, as seen from the right; Fig. 5, a side view, partly in section, and on an enlarged scale, of the compression ring; and, Fig. 6, a transverse section through the same, on the line $b\ b$ of Fig. 5.

In the practice of the invention, referring descriptively to the specific embodiment thereof which is herein exemplified, a ball member, $1^a$, in the form of a section of a sphere, is formed or fixed on one end of a pipe section, 1, and, is fitted, with the interposition of suitable packing, in a socket member, $4^a$, which is formed or fixed on the adjoining end of an adjoining pipe section, 4, means for compressing the packing to maintain a tight joint, being also applied, as hereinafter described.

To this end, there is provided a bearing gland, 3, of annular form, having a projection of smaller diameter on one of its sides, recessed to form an internal bearing face, $3^a$, which is curved correspondingly with the surface of the ball member, $1^a$. The projection of the bearing gland has an external screw thread, $3^b$, cut upon it, and the bearing gland is rigidly secured to the socket member, $4^a$, by bolts, 2, passing through interposed longitudinal spacing rings, $4^b$, and through the bearing gland, 3, said bolts being engaged by tightening nuts, $2^a$, bearing on the face of the gland, 3, further from the socket member. As herein illustrated, the gland, 3, is formed in one piece, but it may, if preferred, be split into two sections, as for application on curved pipe.

The packing ring, 5, which is interposed between the ball and the socket members, may be of any suitable known material, and is brought to a tight bearing on said members, by adjustment of a compresson ring, 6, fitting in the socket member, between the packing ring and the bearing gland, and having an internal screw thread, $6^a$, cut upon it, which engages the external screw thread, $3^b$, of the bearing gland, 3. A follower ring, 7, is located between the packing ring, 5, and the compression ring, 6, through which follower ring the compression ring bears on the packing ring, and recesses, $6^b$, are formed in the periphery of the compression ring, into which a tool, 8, may be inserted, between the spacing rings, $4^b$, for turning the compression ring, to effect the adjustment thereof proper to exert the necessary pressure of said ring on the packing ring.

It will be seen that the invention comprehends a construction in which a rigid outer bearing gland withstands the outward thrust on the ball member, due to fluid pressure in the pipe sections, and an adjustable packing compression ring, the pressure of which can be uniformly increased, as from time to time required to prevent leakage, without disturbing the connection or adjustment of the rigidly connected bearing gland. The simplicity and facility of adjustment of the appliance will be manifest to those skilled in the art, together with the fact that such adjustment by those unfamiliar with its principle as would clamp the ball member too tightly together, will be prevented.

The invention herein claimed and desired to be secured by Letters Patent is:

1. In a ball joint appliance for pipes, the combination of a ball member; a socket member, having a concave bearing face engaging the convex inner end of the ball member, and a plurality of spaced members extending from the outer end of said socket member, having outer faces cooperating to form a seat; a gland rigidly secured to the socket member, having a concave bearing face engaging the convex outer end of the ball member, and cooperating with the concave bearing face of the socket member, to retain said ball member against longitudinal movement, said gland abutting said seat, whereby said concave faces cooperate to permit rotation of the ball without play; a packing interposed between the ball and socket members; and an axially rotatable ring, interposed between the socket member and gland, and having threaded engagement with one of said last specified members, whereby the ring may be advanced to increase the pressure on the packing, said ring having means, exposed between said spaced members, for the application of a tool to effect advancing of said ring.

2. In a ball joint appliance for pipes, the combination of a ball member; a socket member, having a concave bearing face engaging the convex inner end of the ball member, and a plurality of spaced members extending from the outer end of said socket member, having outer faces cooperating to form a seat; a gland rigidly secured to the socket member, having a concave bearing face engaging the convex outer end of the ball member, and cooperating with the concave bearing face of the socket member, to retain said ball member against longitudinal movement, said gland abutting said seat, whereby said concave faces cooperate to permit rotation of the ball without play; a packing interposed between the ball and socket members; and an axially rotatable ring, interposed between the socket member and gland, and having threaded engagement with the said gland, whereby the ring may be advanced to increase the pressure on the packing, said ring having means exposed between said spaced members for the application of a tool to effect advancing of said ring.

HARRY S. BURNHAM.